Dec. 23, 1941.  G. H. VAN DE GRIENDT  2,266,941
RECOVERY OF ORGANIC LIQUIDS AND APPARATUS THEREFOR
Filed April 22, 1940
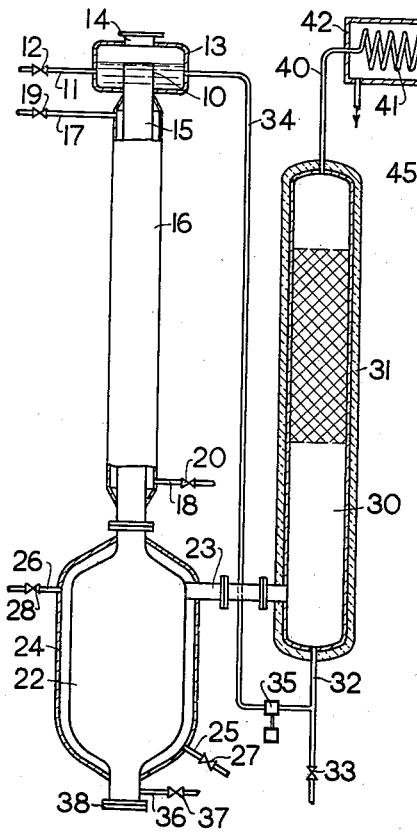
Fig. I
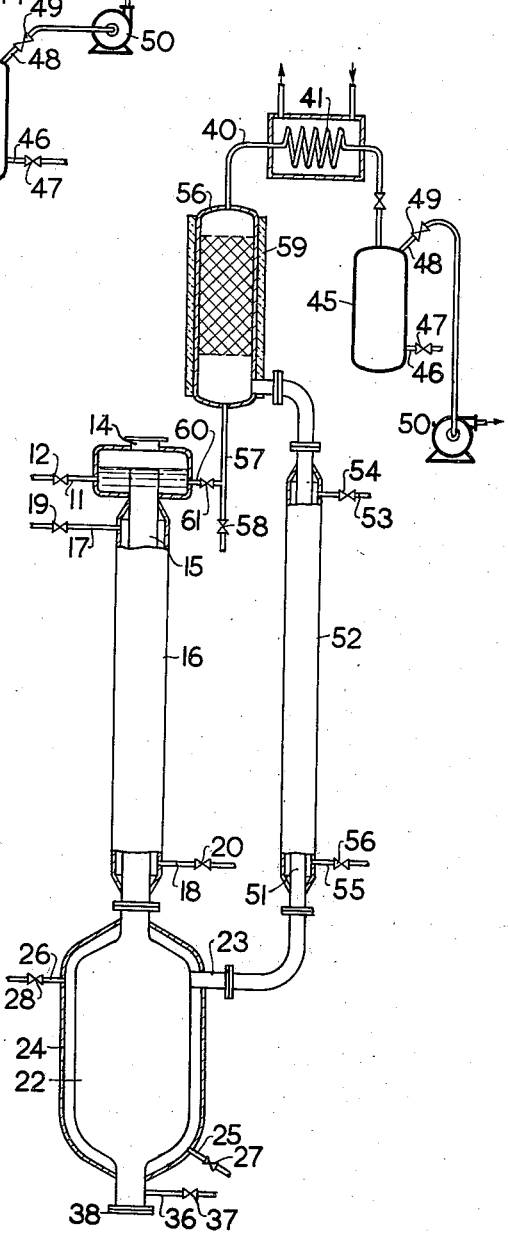
Fig. II
Inventor: Gerald H. Van de Griendt
By his Attorney:

Patented Dec. 23, 1941

2,266,941

UNITED STATES PATENT OFFICE 2,266,941

RECOVERY OF ORGANIC LIQUIDS AND APPARATUS THEREFOR

Gerald H. van de Griendt, San Francisco, Calif., assignor to Shell Development Company, San Francisco, Calif., a corporation of Delaware Application April 22, 1940, Serial No. 330,808

11 Claims. (Cl. 202—64)

The present invention relates to a process for the recovery of volatile organic compounds and/or normally solid and involatile materials from mixtures comprising these compounds and relates more particularly to the recovery of organic oxy-compounds from admixture with one or a plurality of inorganic salts.

In accordance with my invention normally liquid organic compounds in admixture with undesirable constituents comprising higher boiling organic liquids and involatile materials, dissolved or suspended, or both dissolved and suspended therein, are caused to flow in a substantially thin film over a heated surface forming part of a vaporizing zone to effect the substantially complete and rapid vaporization of the desired normally liquid organic compound, leaving the undesired unvaporized constituents in the liquid or solid state. The products pass from the vaporizing zone into an externally heated enlarged zone wherein separation of vaporized from unvaporized constituents is brought about. From the enlarged externally heated zone the vaporized products pass through a spray separating and partial condensing zone wherein undesirable constituents comprising vaporized and unvaporized materials remaining in the vapors of the desired product are separated therefrom. Vapors, comprising the desired final product, pass from the spray separating and partial condensing zone into a suitable condensing zone wherein condensation is brought about.

The process of the invention is particularly adapted to the recovery of organic oxy-compounds such as monohydric alcohols, polyhydric alcohols, ethers, esters, aldehydes, ketones, olefine oxides, halohydrins, glycidols and the like from their aqueous solutions containing one or a plurality of dissolved salts. Many of such organic oxy-compounds, particularly the polyhydric alcohols, the olefine oxides and the halohydrins, may be prepared in commercial quantities, in accordance with known processes, by subjecting the corresponding hydrolyzable halogenated organic compound such as the olefine dihalides, olefine halohydrins, glycerine halohydrins and the like to a hydrolysis treatment with water in the presence of a basic neutralizing agent. The basic agent which is usually a basic metal hydroxide or a basic metal salt reacts with the hydrogen halide liberated during the course of the hydrolysis reaction to neutralize all or a part of the same and form a metal salt which dissolves in the aqueous reaction mixture along with at least a part of organic reaction product. Thus the reaction results in an aqueous solution of the organic reaction product and a salt. Recovery of the organic reaction product in a substantially pure form necessitates, as the first step, the separation of the organic product or the organic product and water, as well as any of the unreacted halogenated organic compound which may be present, from the salt.

Application of distillation as the method of effecting the separation of the organic product from their salt solutions is often made impractical and uneconomical because of the behavior of the materials being distilled at the conditions to which they must be subjected in apparatus heretofore available for large scale simple distillation operation, or because of the involved nature of apparatus attempting to avoid these inherent difficulties. Thus in the separation of polyhydric alcohols from crude mixtures comprising them and salt-containing undesirable constituents as generally carried out on large scale heretofore, substantial quantities of the polyhydric alcohols are maintained at relatively high temperatures in the apparatus for periods of time sufficiently long to cause considerable loss of yield due to polymerization and decomposition reactions favored at the distillation temperatures by the presence in the crude mixtures of the salt-containing undesirable constituents. These and other difficulties encountered indicate the need in large scale operation for a simple distillation process and apparatus which offer a minimum time of contact of product and admixed impurity at the temperature of operation.

It is an object of the present invention to provide a novel simple process and apparatus for the recovery of volatile organic compounds and/or normally solid and involatile materials from mixtures comprising both such components wherein the time of contact of the desired volatile organic compound with the involatile materials at the temperature of operation is reduced to a minimum.

It is a further object of the invention to provide a practical and economical process and apparatus therefor, particularly adapted to the recovery of polyhydric alcohols and the like compounds such as glycol, glycerol, etc. from undesirable materials comprising higher boiling organic constituents and inorganic salts admixed therewith. Other objects of my invention will become apparent from the following detailed description thereof.

For a more complete understanding of my invention the process and apparatus in accordance therewith will be described with reference to the separation of a polyhydric alcohol from admixture with higher boiling organic liquids, inorganic salt and water. It is to be understood, however, that the process and apparatus therefor in accordance with my invention is in no wise limited to the separation of mixtures comprising the specific components selected for the purpose of illustrating the invention. The description will be made with reference to the attached drawing forming a part of this specification and in which Figure I represents a more or less diagrammatical elevational view of one form of apparatus suitable for carrying out the process in accordance with the invention, and Figure II represents a more or less diagrammatical elevational view of a modified form of the apparatus shown in Figure I in which like reference characters represent parts of apparatus which are the same and alike in both figures.

Crude polyhydric alcohol from any suitable source, as obtained, for example, from petroleum hydrocarbons and comprising, for example, about 80% glycerol, 8% inorganic salt, 7% water and 5% higher boiling organic liquids is drawn from any source and passed through line 11, controlled by valve 12, into a feed accumulator 13 provided with a manhole 14. The charge may be caused to flow through line 11 by means of the maintenance of a subatmospheric pressure in the apparatus comprising feed accumulator 13, or by a sole or additional pumping means not shown in the drawing. From feed accumulator 13 the charge is passed in a substantially thin film over the heated surface of a vaporizing zone. The vaporizing zone may suitably consist of an elongated cylindrical chamber 15, extending through the bottom of feed accumulator 13 into the lower part thereof along its vertical axis. The annular space formed in the lower part of accumulator 13 by the vertical walls and bottom thereof and the intruding extension 10 of vaporizer 15 defines a reservoir for the charge whence it overflows into vaporizer 15. Rate of flow through line 11 is controlled to obtain a uniform flow of liquid charge over the rim or lip of extension 10 of vaporizer 15 assuring a steady downflow of a substantially thin film of liquid charge along the wall of vaporizer 15. Although not shown in the drawing any suitable means, such as, for example, deflecting means may be resorted to, to maintain the flow of charge against the wall of vaporizer 15.

The relative dimensions of vaporizer 15 permit great latitude depending upon the required capacity of the apparatus, the nature of the charge and rate of flow conducive to the most desirable condition of rapid vaporization. I may use a vaporizer having a ratio of diameter to length of for example, about $\frac{1}{2}$ to about $\frac{1}{18}$. It is to be understood, however, that the invention is in no wise limited to a vaporizer of any specific dimensions. Vaporizer 15 is provided with a suitable, controlled, external heating means. This may consist, for example, of a jacket 16, provided with inlet 17 and outlet 18, controlled by valves 19 and 20 respectively, through which a suitable heating medium such as, for example, oil heated to an elevated temperature by a suitable source of heat not shown in the drawing is passed. Though not shown in the drawing, an additional heating surface formed by a pipe, through which a heating fluid is passed, and extending through the length of vaporizer 15 along the longitudinal axis thereof may, if desired be provided. The temperature of the oil flowing through jacket 16 is controlled to effect the substantially complete and rapid vaporization within vaporizer 15 of the glycerol in the charge flowing therethrough. It will be seen that the rapid and substantially complete vaporization of the glycerol content of the charge within vaporizer 15 reduces to a minimum the time during which the glycerol and salt impurity are in intimate contact at high temperatures. This avoids the considerable loss of glycerol due to polymerization and decomposition which I have found is encountered during substantially prolonged intimate contact of the glycerol and salt at elevated temperatures.

The temperature at which the heating medium in jacket 16 is to be maintained is, of course, governed by the nature of the charge, the rate of vaporization desired and the operating conditions. I have found that in the distillation of crude glycerol as described herein, in an apparatus having a vaporizer with a ratio of internal diameter to length of 1 to 18, an oil temperature from about 190° C. to about 210° C. and preferably not exceeding 200° C. gave satisfactory results when operating under an absolute pressure of, for example, about 1 mm. to about 8 mm. of mercury. Under these conditions the vaporized products in the lower part of vaporizer 15 will have a temperature of, for example, from about 150 to about 185° C. Of course, higher oil temperatures may be maintained in jacket 16 but I have found that at about 210° C. excessive decomposition begins to occur as is evident from the gas evolution and increased content of hydrolyzable material in the final product.

Effluence from vaporizer 15 comprising vaporized glycerol, steam and unvaporized material comprising undesirable higher boiling organic liquids and inorganic salts, passes downwardly into the upper part of an enlarged externally heated separating zone. The separating zone may consist of a chamber 22, provided with vapor outlet 23 and any suitable, controlled, external heating means. The external heating means may consist of a jacket 24, provided with inlet 25 and outlet 26, controlled by valves 27 and 28 respectively, and through which a suitable heating medium, for example, oil heated to an elevated temperature by an outside source of heat, not shown in the drawing, is circulated. The temperature of the oil in jacket 24 is controlled to effect the vaporization of any glycerol which may have entered chamber 22 in the liquid state, or which may have condensed therein, as well as to prevent cooling of vaporized glycerol below the desired temperature. The temperature of the oil in jacket 24 may be substantially that, or slightly above that maintained in jacket 16.

Vapors comprising glycerol pass from chamber 22 through vapor line 23 into a zone wherein entrained undesirable constituents in the glycerol vapors are removed therefrom. This zone may consist of a suitable vessel or tower 30 provided with suitable baffles or trays, or preferably packed in part or in its substantial entirety with any suitable packing material such as, for example, Raschig rings, crushed stone, metallic material of suitable form and shape such as rings of copper, aluminum, etc.

Within tower 30, undesirable constituents in the vapor state are condensed and separated from the glycerol vapors together with entrained mist or spray, and collected in the liquid state in the lower part thereof. Any solid matter, for example, inorganic salt, which may have been entrained by the vapors passing into tower 30 are separated therein from the vapors. Temperature conditions within tower 30 may be controlled by any suitable means to effect condensation therein of sufficient glycerol to wash down into the lower part of tower 30 any higher boiling material or involatile salts which may accumulate upon baffles or packing therein during operation. If desired, means may be provided for the introduction of a solvent into tower 30, at an intermediate part thereof, to remove higher boiling or involatile material therein either during operation or during interruption of operation. Solvents introduced during operation would be limited to materials boiling substantially above the boiling point of glycerol and forming no azeotropic or constant boiling mixtures therewith. Tower 30 is insulated by suitable means such as, for example, an asbestos covering 31, to avoid substantial heat loss by radiation. Similarly vapor line 23 may be insulated to prevent heat loss by radiation.

Liquid, comprising undesirable higher boiling constituents, glycerol and inorganic salts, is drawn from the bottom of tower 30 through line 32, controlled by valve 33, and eliminated from the system. In a preferred method of operation all or a part of the liquid drawn from tower 30 through line 32, is forced in part or in its entirety, by means of pump 35, through line 34 into feed accumulator 13 to recover the glycerol content thereof and utilize the higher boiling constituents to wash involatile salt from vaporizer 15 into separator 22. Though not shown in the drawing, line 34 is preferably covered with an insulating medium to prevent loss of heat by radiation. If desired liquid drawn from tower 30 through line 32 may be passed in part or in its entirety into chamber 22 by means not shown in the drawing.

Material remaining unvaporized and comprising undesirable higher boiling organic liquids and inorganic salts suspended or dissolved therein, collecting in chamber 22 may be drawn therefrom either continuously or intermittently by means of line 36 provided with valve 37. A manhole 38 is provided in chamber 22 to permit the removal of solid material, for example, inorganic salts collected in chamber 22.

Matter tending to remain as a solid distillation residue, for example, sodium chloride, will separate out upon the walls of vaporizer 15 and chamber 22. A substantial amount of the salt will be washed from the walls of vaporizer 15 into separating chamber 22 by the higher boiling constituents of the charge and of the liquid recycled through line 34. Some salt will be entrained in the glycerol vapors flowing into chamber 22. The comparatively large volume of the separating chamber 22 with the resulting decrease in velocity of vapor-flow therethrough causes the separation of substantially all of the entrained salt from the vapors within separating chamber 22. When distilling a charge with a substantial salt content, the process should be carried out in such a manner that an even salt cake is formed throughout the length of vaporizer 15. I have found that this is accomplished by judicious control of the rate of feed and the temperature of the oil circulating through jacket 16 to avoid over-rapid vaporization of glycerol in any localized section of evaporator 15.

Salt deposited upon the walls of the apparatus may be removed by interrupting the operation and introducing a solvent for the salt into the apparatus by means not shown in the drawing. The resulting solution may be withdrawn from the apparatus through line 36. If desired, means such as, for example, mechanical scrapers, not shown in the drawing, may be positioned within vaporizer 15 to remove depositions from the wall thereof and the distillation operation may be continued until a substantial deposit of salt has formed within chamber 22 when the operation may be interrupted to remove the solid material from the apparatus in substantially the solid state through manhole 38 with or without the aid of a solvent for the deposited material.

Vapors, comprising substantially pure glycerol and some steam resulting from water initially in the charge pass overhead from tower 30, through line 40 to a condenser. The temperature of the glycerol vapors in line 40 will be dependent upon the pressure maintained throughout the apparatus and will leave tower 30 at a temperature preferably but slightly above that at which glycerol will condense at the pressure reigning in line 40. The condenser may comprise a conventional coil 41 immersed in a cooling medium, for example, water contained in a suitable tank 42. Within condensing coil 41, vaporized products comprising glycerol are condensed and passed through line 43, controlled by valve 44 into receiver 45. Any water, if present, in the final product, may be separately withdrawn from receiver 45 by means not shown in the drawing. From receiver 45 the final product is drawn through line 46 controlled by valve 47 to suitable storing means not shown in the drawing. In a modification of the process and apparatus of the invention as shown in Figure II of the drawing, tower 30 is replaced with an elongated zone maintained at a temperature above that at which the desired vaporized product, for example, glycerol vapors emanating from chamber 22 will condense. The elongated zone may suitably consist of a pipe 51, provided with suitable means for maintaining the desired temperature therein. Thus pipe 51 may be provided with a jacket 52 equipped with inlet 53 controlled by valve 54 and outlet 55, controlled by valve 56, and a suitable heating medium, for example, steam obtained from a source not shown in the drawing, may be passed therethrough. By maintenance of a proper temperature within jacket 52, undesirable higher boiling constituents carried over with the vapors emanating from chamber 22 through line 23 will condense in line 51 and flow into chamber 22.

Vapors pass directly from line 51 into a trap-out zone wherein additional undesirable constituents remaining in the glycerol vapors are removed therefrom. This trap-out zone may consist of a tank or tower 56 provided with suitable baffles or trays or it may be packed in part or in its entirety with suitable packing material such as used in tower 30 of Figure I. Tower 56 is insulated with a suitable insulating means such as, for example, an asbestos covering 59 to prevent loss of heat by radiation. Within tower 56 undesirable constituents in vapor form will be condensed and separated together with entrained mist or spray from the glycerol vapors and collected in the lower part of the tower. Any solid material entrained by the vapors into tower 59 will be separated therein from the desired glycerol vapors. Liquid comprising undesirable high boiling constituents and a small quantity of salt suspended or dissolved therein, is drawn from the bottom of tower 56 through line 57 controlled by valve 58, and eliminated from the system. In a preferred method of operation the liquid drawn from tower 56 through line 57, is passed in part or in its entirety through line 60, controlled by valve 61, into charge accumulator 13.

Vapors comprising glycerol leaving tower 56 are passed through line 40, to condenser 41 and into receiver 46 substantially as described in the illustrative description of the invention made above in connection with Figure I.

The distillation of material comprising polyhydric alcohols as, for example, glycerol is preferably effected at subatmospheric pressure. A line 48, provided with valve 49, connects receiver 45 to a suitable means, for example, a vacuum pump 50, for maintaining the desired subatmospheric pressure within and throughout the apparatus. It is to be understood, however, that the apparatus in accordance with my invention is not limited to the use of processes preferably carried out at subatmospheric pressures and is applicable to distillation of materials capable of being distilled at atmospheric and superatmospheric pressures.

The operation of the apparatus may, if desired, be effected in the substantially complete absence of air in order to avoid oxidizing effects upon materials in the apparatus. This may be done by the use of an inert fluid, such as, for example, nitrogen, to replace any air space within the apparatus during operation.

The apparatus in accordance with my invention may be constructed of any suitable materials capable of withstanding operating conditions. Parts of the apparatus coming into contact with any part of the charge should preferably be built of materials which are not affected by it or which themselves do not catalytically affect it at the operating conditions.

The following example is given for the purpose of further illustrating the process and apparatus in accordance with the invention. Conditions of operation, yields, etc., given therein are not to be construed as in any way limiting my invention.

*Example*

Crude glycerols having the composition indicated in the table below were distilled in accordance with the process of the invention and in the apparatus described in the above illustrative description thereof. Oil was used as the heating medium in jackets 16 and 24 about the vaporizing and separating zones. Conditions of operation and yields are shown in the following table:

|  | Run number | | |
|---|---|---|---|
|  | 1 | 2 | 3 |
| Crude glycerol composition (percent by weight): | | | |
| Glycerol | 84.4 | 84.4 | 84.8 |
| High boiling material | 2.24 | 2.24 | 3.4 |
| Salt | 7.9 | 7.9 | 7.1 |
| Water | 5.4 | 5.4 | 4.7 |
| Temperature of oil in jackets 16 and 24 (°C.) | 200 | 200 | 205 |
| Pressure—mm. of Hg | 3–4 | 3–4 | 4–6 |
| Operating time hours | 12 | 16 | 24 |
| Volume of crude glycerol charged gals | 36 | 48 | 67.2 |
| Feed rate of charge gals./hr | 3 | 3 | 2.8 |
| Glycerol distilled over (percent by weight) | 99.6 | 99.6 | 99.0 |

Although I have selected glycerol as a preferred example of a polyhydric alcohol to be recovered by the process and in the apparatus of my invention, other polyhydric alcohols, such as propylene glycol, the butylene glycols, the amylene glycols, alpha-methyl glycerol, beta-methyl glycerol and the like as well as their homologues, analogues and suitable substitution products may be recovered in a like manner from admixture with undesirable constituents comprising higher boiling organic liquids, water, and inorganic salts. The process and apparatus are also applicable to the recovery of the polyhydric alcohol derivatives such as the olefine oxides (ethylene oxide, propylene oxide, etc.), the glycidols (glycidol, alpha-methyl glycidol, beta-methyl glycidol, etc.), the halohydrins (ethylene chlorhydrin, propylene chlorhydrin, glycerin monochlorhydrin, glycerin dichlorhydrin, etc.) and the like from the aqueous solutions containing one or more salts.

It is to be understood that the invention is in no wise limited to that set forth in the foregoing detailed description of a preferred embodiment of the invention made for the purpose of making the invention more clear and that modifications of apparatus and operating conditions may be made without departing from the spirit and scope of the invention. Thus, although but a single vaporizing tube 15 has been shown in the drawing, the elongated substantially vertical vaporizing zone may comprise a plurality of vaporizing tubes arranged in a substantially vertical single tube bundle.

I claim as my invention:

1. A process for separating glycerol from crude glycerol comprising glycerol, higher boiling constituents and salt, which comprises passing the crude glycerol in a thin vertically flowing film over the externally heated walls of a substantially vertical elongated vaporing zone, maintaining the walls of the vaporizing zone at a temperature above that at which glycerol will vaporize to effect the rapid vaporization of substantially all of the glycerol in the vaporizing zone, passing the products from the vaporizing zone into an enlarged externally heated separating zone to effect the separation of vapors comprising glycerol from unvaporized products, maintaining the separating zone at a temperature sufficiently high to prevent condensation of glycerol vapors therein, withdrawing unvaporized products from the separating zone, passing vapors comprising glycerol from the separating zone to an entrainment separating zone, separating entrained higher boiling constituents from the vapors in the entrainment separating zone, passing higher boiling constituents from the entrainment separating zone to the vaporizing zone, withdrawing vapors comprising glycerol from the entrainment separating zone, and condensing vapors comprising glycerol withdrawn from the entrainment separating zone.

2. A process for separating glycerol from crude glycerol comprising glycerol, higher boiling liquids and salt which comprises passing the crude glycerol in a thin vertically flowing film through an externally heated elongated vaporizing zone of restricted cross-sectional area to effect the rapid vaporization of glycerol, passing the products from the vaporizing zone into an enlarged externally heated primary separating zone, separating vapors comprising glycerol from unvaporized products in the primary separating zone, passing said vapors comprising glycerol from the primary separating zone into a secondary separating zone, maintaining said secondary separating zone at a temperature at which entrained constituents higher boiling than glycerol will condense, passing liquid condensate from the secondary separating zone to the vaporizing zone, withdrawing vapors comprising glycerol from the secondary separating zone, and condensing the vapors comprising glycerol withdrawn from the separating zone.

3. A process for separating glycerol from an aqueous crude glycerol solution comprising higher boiling liquids and dissolved salts which comprises passing the crude solution in a thin vertically flowing film through an elongated, externally heated, substantially vertical vaporizing zone to effect the rapid vaporization of glycerol and water, passing the heated products from the vaporizing zone into an enlarged externally heated separating zone, effecting the separation of glycerol and water vapors from unvaporized products comprising higher boiling constituents and salts in the separating zone, passing vapors from the separating zone into an entrainment separating zone, separating entrained higher boiling constituents from vapors in the entrainment separating zone, withdrawing said separated higher boiling constituents from the entrainment separating zone, separately withdrawing vapors comprising glycerol and water vapors from the entrainment separating zone, and condensing the vapors comprising glycerol and water vapors withdrawn from the entrainment separating zone.

4. A process for separating glycerol from salt-containing crude glycerol comprising passing the crude glycerol in a thin downwardly flowing film through a substantially vertical, externally heated elongated vaporizing zone of restricted cross sectional area to effect the rapid vaporization of glycerol, passing the products from the vaporizing zone into an enlarged externally heated separating zone, effecting the separation of glycerol vapors from salt in the separating zone, passing glycerol vapors from the separating zone to a second separating zone, passing the glycerol vapors upward through a bed of contact material in said second separating zone to remove entrained salt from the glycerol vapors, withdrawing salt-free glycerol vapors from the second separating zone and condensing the salt-free glycerol vapors.

5. In a process for separating a polyhydric alcohol from a mixture comprising the polyhydric alcohol, higher boiling constituents and salt, the steps of passing the mixture in a thin downwardly flowing film through an elongated externally heated vaporizing zone of restricted cross-sectional area to effect the rapid vaporization of the polyhydric alcohol, passing the products from the vaporizing zone into an enlarged externally heated vapor separating zone, effecting the separation of vapors comprising polyhydric alcohol from unvaporized products, withdrawing unvaporized products from the vapor separating zone, passing vapors comprising the polyhydric alcohol from the vapor separating zone to an entrainment separating zone, separating entrained higher boiling constituents from the vapors in the entrainment separating zone, passing liquid comprising higher boiling constituents from the entrainment separating zone to the vaporizing zone, withdrawing vapors comprising the polyhydric alcohol from the entrainment separating zone and condensing the vapors comprising the polyhydric alcohol withdrawn from the entrainment separating zone.

6. In an apparatus for separating glycerol from crude glycerol comprising glycerol, higher boiling liquids and salt, an elongated substantially vertical vaporizing zone of restricted cross-sectional area, means for applying heat to the vaporizing zone, means for passing the crude glycerol in a thin downwardly flowing film over the walls of the vaporizing zone, an enlarged vapor separating zone, means for applying heat to the vapor separating zone, means for withdrawing unvaporized material from the vapor separating zone, an entrainment separating zone, means for passing vapors from the vapor separating zone to the entrainment separating zone, means for passing liquid from the entrainment separating zone to the means for passing crude glycerol into the vaporizing zone, means for withdrawing vapors from the entrainment separating zone, and means for cooling the vapors drawn from the entrainment separating zone.

7. An apparatus for separating a polyhydric alcohol from a mixture consisting of the polyhydric alcohol, higher boiling products and salt, comprising an elongated, substantially vertical, externally heated vaporizing zone of restricted cross-sectional area, means for introducing the mixture into the vaporizing zone in a thin vertically flowing film, an enlarged externally heated vapor separating zone in direct communication with the outlet of the vaporizing zone, means for separately withdrawing unvaporized products from the vapor separating zone, an entrainment separating zone in vapor communication with the vapor separating zone, means for passing liquid from the entrainment separating zone to the vaporizing zone, and means for withdrawing and condensing the vapors withdrawn from the entrainment separating zone.

8. An apparatus for separating a polyhydric alcohol from salt-containing crude polyhydric alcohol comprising, a substantially vertical elongated vaporizing zone, means for conveying the crude polyhydric alcohol in a thin film through the vaporizing zone and for removing the total mixture formed in said vaporizing zone at the end opposite to that of alcohol introduction, an externally heated primary separating zone in direct communication with the outlet of the vaporizing zone, means for withdrawing unvaporized products from the primary separating zone, a secondary separating zone, means for passing vapors from the primary to the secondary separating zone, means for withdrawing vapors from the secondary separating zone and means for condensing vapors withdrawn from the secondary separating zone.

9. In a process for separating a volatile substantially water-soluble organic oxy-compound from a mixture comprising the organic oxy-compound, higher boiling constituents, water and a dissolved salt, the steps of passing the mixture in a thin downwardly flowing film through an elongated externally heated vaporizing zone of restricted cross-sectional area to effect the rapid vaporization of the organic oxy-compound, passing the materials from the vaporizing zone into an enlarged externally heated vapor separating zone wherein the vapors of the organic oxy-compound and water are separated from unvaporized materials, withdrawing unvaporized materials from the vapor separating zone, passing the organic oxy-compound vapors and water vapor from the vapor separating zone to an entrainment separating zone, separating entrained higher boiling constituents from the vapors in the entrainment separating zone, passing the liquid higher boiling constituents from the entrainment separating zone to the vaporizing zone, withdrawing vapors of the organic oxy-compound and water from the entrainment separating zone and condensing said vapors.

10. An apparatus for separating a volatile substantially water-soluble organic oxy-compound from a mixture of the organic oxy-compound, higher boiling constituents and a salt, comprising an elongated, substantially vertical, externally heated vaporizing zone of restricted cross-sectional area, means for introducing the mixture into the vaporizing zone in a thin vertically flowing film, an enlarged externally heated vapor separating zone in direct communication with the outlet of the vaporizing zone, means for separately withdrawing unvaporized material from the vapor separating zone, an entrainment separating zone in vapor communication with the vapor separating zone, means for passing liquid from the entrainment separating zone to the vaporizing zone, and means for withdrawing and condensing the vapors withdrawn from the entrainment separating zone.

11. In a process for separating a volatile, substantially water-soluble organic oxy-compound from a mixture comprising the organic oxy-compound, higher-boiling constituents, water, and a dissolved salt, the steps of passing the mixture in a thin, vertical-flowing film through an elongated, externally heated, substantially vertical vaporizing zone to effect the rapid vaporization of the organic oxy-compound, passing the materials from the vaporizing zone into an enlarged, externally heated vapor-separating zone wherein the vapors of the organic oxy-compound and water are separated from the unvaporized materials comprising higher-boiling constituents and salt, passing the organic oxy-compound vapors and water vapor from the vapor separating zone to an entrainment separating zone, separating entrained higher-boiling constituents from the vapors in the entrainment separating zone, withdrawing said separated higher-boiling constituents from the entrainment separating zone, withdrawing the vapors of the organic oxy-compound and water from the entrainment separating zone, and condensing said vapors.

GERALD H. van de GRIENDT.